328-237 SR
6/2/87 03 H 000,290

United States Statutory Invention Registration [19]

[11] Reg. Number: H290

Manheimer [43] Published: Jun. 2, 1987

[54] PLASMA ASSISTED MODIFIED BETATRON

[75] Inventor: Wallace M. Manheimer, Silver Spring, Md.

[73] Assignee: United States of America, Washington, D.C.

[21] Appl. No.: 807,300

[22] Filed: Dec. 10, 1985

[51] Int. Cl.[4] ..... H05H 7/00; H05H 11/00

[52] U.S. Cl. ..... 328/237; 313/62

[56] References Cited

U.S. PATENT DOCUMENTS 3,975,689 8/1976 Geizer et al. .
4,244,782 1/1981 Dow .
4,392,111 7/1983 Rostoker .

OTHER PUBLICATIONS

Publication, Physical Review Letters, vol. 52, No. 18, "Successful Betatron Acceleration of Kiloampere Electron Rings in RECE-Christa." Taggart et al. Apr. 30, 1984.

*Primary Examiner*—Stephen C. Buczinski

*Assistant Examiner*—Linda J. Wallace

*Attorney, Agent, or Firm*—Robert F. Beers; William T. Ellis

[57] ABSTRACT

In a modified Betatron a low density background plasma is maintained in the vacuum chamber causing image charges in response thereto to form in the chamber wall. These image charges cause the self forces of the electron beam being accelerated in the betatron to be directed inward in the polodial plane thus eliminating injection problems, the diamagnetic to paramagnetic transition, and the l=2 resistive wall instability.

7 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

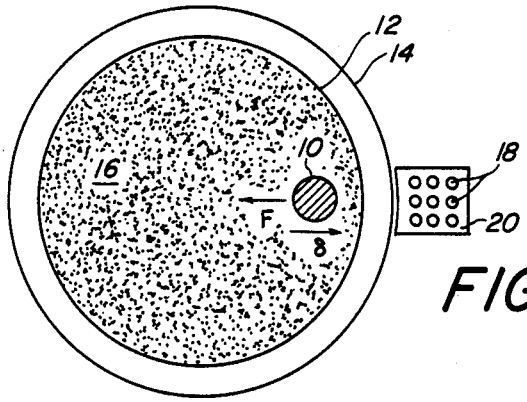
INWARD FORCE
$$(\gamma^{-2}-f)\frac{qI}{10\delta}-\frac{qB_z\rho}{2R_o}$$
image, plasma, focusing
FIG. 1(a)
OUTWARD FORCE
$$\gamma^{-2}\frac{qI}{10\delta}-\frac{qB_z\rho}{2R_o}$$
image, focusing
FIG. 1(b)
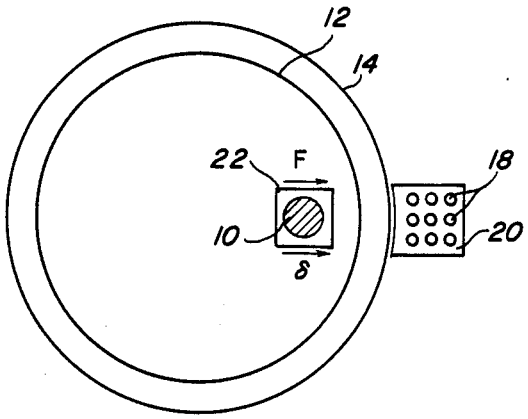
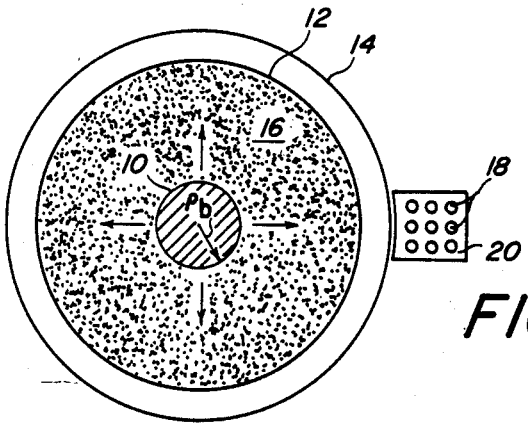
INWARD FORCE
$$F=\frac{qI}{10\rho_b}(\gamma^{-2}-f)-\frac{qB\rho_b}{2R_o}$$
image, plasma, focusing
FIG. 2(a)
OUTWARD FORCE
$$F=\frac{qI(\text{AMPS})}{10\gamma^2\rho_b(\text{cm})}-\frac{qB_z(\text{GAUSS})\rho_b}{2R_o}$$
image, focusing
FIG. 2(b)
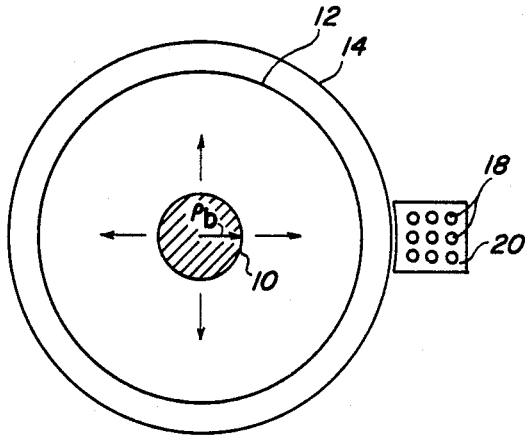

PLASMA ASSISTED MODIFIED BETATRON

BACKGROUND OF THE INVENTION

The present invention relates to high current, high energy electron beams. More specifically, the present invention relates to a modified betatron which has beam self forces that are inward in the polodial plane.

There is a great interest in the development of high current, high energy electron beams. The principal technique to accelerate electron rings, which comprise the electron beam, is a conventional betatron. See, for instance U.S. Pat. No. 4,392,111, by Rostaker, 1983. However, this technique is limited by the fact that the outward self forces of the electron beam must be smaller than the externally imposed focusing forces of the betatron. These focusing forces are controlled by the gradient of the vertical(z) field, the field parallel to the axis of the betatron. The focusing is parameterized by the field index $$\eta = \frac{-r}{B_z} \frac{\partial B_z}{\partial r}.$$

For $0<\eta<1$, the focusing forces are inward in both the radial and vertical directions in the poloidal plane. In practice, this limits the current to several hundred amps. Another scheme is to use a plasma betatron. See, Taggert et al., "Successful Betatron Acceleration of Kiloampere Electron Rings in RECE-Christa", Physical Review Letters, Vol. 52, No. 18, p. 1601-1604, April 1984, for a more complete description of a plasma betatron. Here a runaway tokamak discharge is produced which can have a current of many kiloamps and a voltage of 10 MeV or more. However, the beam has a large energy spread with no way to extract it from either the plasma or the magnetic field. Another scheme is a modified betatron which uses a toroidal magnetic field to overcome the lack of external field focusing. See U.S. Pat. No. 4,481,475, by Kapetanakos and Sprangle, 1984, for a more detailed description of the modified betatron.

However, the disadvantages of the modified betatron are threefold. First of all, one must inject the beam across toroidal field lines in order to have a beam centered in the liner of the betatron. The current scheme of Kapetanakos et al., Phys, Rev. Lett. 49, 741 (1982) proposes to shoot the beam into the toroidal vacuum chamber near the liner. The drift due to the focusing fields and image fields causes the beam to drift in the poloidal plane around the liner. In one toroidal transit (about 20 nsec) it should drift enough to miss the injector. In one poloidal drift time (several hundred nanoseconds), external fields can be changed to bring the beam slightly in from the liner so that it misses the injector again and henceforth. On a longer time scale, wall resistivity causes the beam (if the current is sufficiently low) to drift inward. This occurs because the liner has finite conductivity. The effect of this finite conductivity is to cause a drag force on the beam which causes the beam to spiral either in or out, depending on the beam current.

However there is a significant range of beam currents for which wall resistivity causes the beam to drift outward if it is near the liner, but inward if it is near the center. Since it is unlikely that the beam can reverse drift directions on the way in, the injection scheme of Kapetanakos et al., supra. appears to be viable only for fairly low beam currents. For higher beam currents still, the beam will drift outward no matter what its position is in the poloidal plane.

A second possible difficulty concerning the modified betatron is the diamagnetic to paramagnetic transition. See W. M. Manheiner and J. M. Finn, Particle Accel. 14, 29 (1983); J. M. Finn and W. M. Manheimer, Phys. Fluids 26, 3400 (1983). Depending on whether the net self force is outward or inward in the poloidal plane, the net electron drift velocity in the poloidal plane is in the diamagnetic or paramagnetic direction. A diamagnetic drift velocity means that the electron poloidal velocity crossed with the toroidal magnetic field (right hand rule) produces an inward force in the poloidal plane. A paramagnetic drift means that this force is outward in the poloidal plane. At low energy, where the outward self fields are stronger than the focusing forces, the beam must have an additional inward force to maintain equilibrium. At high energy, where the self forces are weaker than the focusing forces, the beam must have an additional outward force to maintain equilibrium. These forces are provided by the poloidal (diamagnetic or paramagnetic) drift velocity times the toroidal magnetic field. Thus as the high current beam accelerates, it makes a transition from diamagnetic to paramagnetic current flow. It has been shown that subject only to the constraint that the acceleration time $\tau_a \approx 10^{-3}$ sec is very long compared to the drift time, $\tau_D \geqq 10^{-7}$ sec, this transition must suddenly change the topology of the beam orbits in the poloidal plane. Whether the beam can survive such a sudden, violent perturbation is an open question.

Finally, although the focusing fields in the modified betatron stabilize the $l=1$ resistive wall instability, $l=2$ modes are still unstable and pose a real threat to beam confinement in the modified betatron. See R. G. Kleva, E. Ott and P. Sprangle, Phys. Fluids 26, 2689 (1983). The $l=1$ modes causes a displacement of the beam center in the poloidal plane. The $l=2$ modes causes a distortion of the shape of the beam in the poloidal plane from circular to elliptical.

The three fundamental issues identified regarding the high current modified betatron operating with a vacuum background: beam injection, the diamagnetic to paramagnetic transition, and the $l=2$ resistive wall instability will now be more fully discussed.

One of the important issues for the modified betatron is injecting the beam. The present thinking for the Naval Research Laboratory modified betatron experiment is described in Kapetanakos, et al., supra. The beam is injected near the liner and drifts around the edge of the liner through a combination of drift paths generated by the focusing fields (field index) of the betatron and image forces in the vacuum chamber wall due to the beam. The former is directed inward in the poloidal plane, the latter, outward. At high beam current the latter dominates and the beam rotates in a counterclockwise direction as in FIG. 3 of Kapetanakos et al., supra. for the case of a ten kilo Amp beam. If the combination of forces is large enough, the drift velocity will be great enough so that after one toroidal revolution, the beam will be displaced in the poloidal plane by a large enough distance that it misses the injector. Then, since it has many more toroidal transits before it would hit the injector again, macroscopic fields could change sufficiently to bring the beam into the center.

One potential problem with this scheme, is that for higher current beams, the net poloidal force on the beam is outward near the liner, but inward when the beam is at the center. Thus, as the beam continues to spiral in the poloidal plane, at some point it must reverse direction. To see this more quantitatively, if the field index of the beam is $\frac{1}{2}$, which gives rise to optimal confinement in the radial and vertical direction, the focusing field produces an inward poloidal force on a charge q of $$q\frac{B_z}{2}\frac{\rho}{Ro}$$

where $R_o$ is the major radius of the equilibrium orbit, $B_z$ is the vertical field and $\rho$ is the displacement of the beam from the equilibrium orbit in the poloidal plane $\rho^2=(R-R_o)^2+z^2$. The image electric force for a cylindrical system is given by $$E_{im}\,(cgs) = \frac{2I(\text{Amps})\,\rho(\text{cm})}{10(a^2-\rho^2)} \tag{1}$$

where a is the minor radius of the liner.

The actual force is canceled in part by magnetic forces and also by any fractional neutralization f. The fractional neutralization describes the fact that positive ions, with a density of f times the beam density could also be confined by the beam. If the beam is near the wall ($\rho \leqq a$) the net poloidal drift velocity is given by $$\frac{V_D}{C} = \left[(\gamma^{-2}-f)\frac{I(\text{Amps})}{10\delta(\text{cm})B_\theta(\text{Gauss})} - \frac{B_z a}{2B_\theta R_o}\right. \tag{2}$$

where $\delta$ is the distance from the beam center to the liner and $\gamma$ is the electron energy divided by the electron rest energy. Since the beam enters the toroidal liner right near the outer edge of the liner, $\delta$ is roughly equal to the beam radius $\rho_b$.

If the beam is near the center (so $\rho<a$), the poloidal drift is given by $$\frac{V_D}{C} = \frac{2I(\text{Amps})\rho(\text{cm})}{10a^2(\text{cm})B_\theta(\text{Gauss})}\left(\frac{1}{\gamma^2}-f\right) - \frac{B_z}{2B_\theta R_o} \tag{3}$$

For the case of a vacuum modified betatron, the current can be classified as being in one of three ranges:

I. High Current $$5\,a(\text{cm})\gamma^2\,B_\theta\,(\text{Gauss})\,\frac{B_z a}{2B_\theta\,R_o} < I(A) \tag{4}$$

II. Intermediate Current $$10\delta(\text{cm})B_\theta(\text{Gauss})\gamma^2\,\frac{B_z a}{2B_\theta\,R_o} < I(A) < 5\gamma^2 a(\text{cm})B_\theta(\text{Gauss})\,\frac{B_z a}{2B_\theta R_o} \tag{5}$$

III. Low Current $$I(A) < 10\gamma^2\delta(\text{cm})\,B_\theta(\text{Gauss})\,\frac{B_z a}{2B_\theta\,R_o} \tag{6}$$

In the high current regime, the forces on the beam in the poloidal plane are outward and the beam always rotates in the counterclockwise direction. In the intermediate regime, the forces are outward when the beam is near the wall, but inward when the beam is near the center. Thus in this current regime, the beam must reverse its direction of rotation before it gets to the center. Also, at some radius between the center and the wall, the beam will have zero poloidal drift velocity. It seems likely that some time after injection, an intermediate current beam will stagnate around this point and gradually fill the chamber. In the low current regime, the inward focusing forces always dominate and the beam rotation is clockwise.

It is also worth noting that if the liner is resistive, the beam will spiral inward if the net force is inward and visa versa. Thus a resistive wall can only trap a class III low current beam. It is possible that an intermediate current beam can be trapped if it can be brought sufficiently near the center that the net forces are inward. For the parameters of the NRL modified betatron experiment, (see Sprangle et al., supra; Kapentanakas et al., supra, $B_\theta=2\times10^3$, $\gamma=4$, $R_o=10^2$, $a=15$, $\delta=2$, $B_z=140$, the lower and upper currents of the intermediate range are $3.2\times10^3$A and $1.2\times10^4$A. Thus the maximum current which can be trapped by wall resistivity in a vacuum modified betatron is about 3 kA. Actually however, the maximum current is less because at the 3.2 kA level the poloidal drift is zero, so the beam will strike the injector after one toroidal transit. Note that here a cylindrical system is assumed.

Referring to the diamagnetic to paramagnetic transition, once the beam has been injected and is centered in the modified betatron, the question then is about the individual particle orbits in the beam. Each particle feels an inward force due to the focusing fields and an outward force due to the self fields. If the latter dominates, the particle has an $F\times B$ drift in the counterclockwise direction, analogous to the counterclockwise whole beam drift for an outward image force discussed above. Then the J (poloidal) B (toroidal) force is inward. In this case, the beam is said to be diamagnetic. This is analogous to the terminology in plasma physics, where the poloidal current is diamagnetic if it gives an inward force. On the other hand, if the focusing force dominates, the $F\times B$ drift is clockwise and the beam is said to be paramagnetic.

If the beam has uniform density and radius $\rho_b$, the outward force is the electrostatic force canceled by the magnetic force and fractional charge neutralization. A test charge q at $\rho=\rho_b$ feels an outward force $$F_s(esu) = q(\gamma^{-2}-f)\,\frac{I(\text{Amps})}{10\,\rho_b(\text{cm})} \tag{7}$$

The inward focusing force is given by $$F_f = -q\frac{B_z}{2}\,\frac{\rho_b}{R} \tag{8}$$

so the condition for a paramagnetic beam in a vacuum modified betatron is $$\gamma^{-2}\,\frac{I(\text{AMPS})}{10\,r_b(\text{cm})} < \frac{B_z(Gauss)}{2} = \frac{\rho_b}{R} \tag{9}$$

Note that a high current beam is generally diamagnetic. However as it accelerates, the left hand side becomes smaller as $\gamma$ increases, and the right hand side becomes larger because $B_z$ is proportional to $\gamma$. Thus for a high current beam which starts out diamagnetic, as it accelerates it ultimately makes a transition and becomes paramagnetic.

One might think this simply means that the poloidal rotation of the particle stops and changes direction. Actually the situation is considerably more complex, and also worse from the point of view of operation of the modified betatron. In a recent series of papers, see Manheimer, supra; Finn, supra; J. M. Grossman, J. M. Finn and W. M. Manheimer, Phys. Fluids, to be published, it has been shown that subject only to the constraint that the acceleration time is very long compared to the drift time, an approximation well-satisfied in the NRL modified betatron (but not satisfied at all in particle simulations of the device), the diamagnetic to paramagnetic transition necessarily results in a change of topology of the beam. The outer beam particles first become paramagnetic and in doing so scrape off the edge of the beam and form a large minor radius hollow beamlet. As the energy continues to increase, the scrapeoff point moves inside the beam and inner beam particles continue to add to the outside of the hollow beamlet. The process is completed when the beam has turned itself completely inside out and has gone from a solid to a hollow beam.

Although this process is complicated, it is very easy to see that in making the transition, the beam must turn itself inside out. To show this, it is only necessary to invoke the conservation of toroidal canonical momentum $P_{74}$. If the poloidal magnetic field is given by $\nabla\Psi\times i_\theta/R$, then $$P_\theta = \gamma\, mRv_\theta + \frac{q\psi}{c} \tag{10}$$

To evaluate $P_{74}$, note that $\gamma=(E-q\phi)/mc^2$ where $\phi$ is the electrostatic potential. For a cylindrical beam of radius $r_b$, $$\phi(\rho) = \begin{cases} \pi nq\rho^2 & \phi < \rho_b \\ \pi bqr_b^2(\ln(\rho/\rho_b) + 1)\rho_b < \rho \end{cases} \tag{11}$$

The flux $\Phi$ has three components. First there is the flux of the vertical field itself, assumed uniform $$\psi_v \frac{B_z R^2}{2} \tag{12}$$

Secondly, there is the flux associated with the focusing field. If the field index is $\frac{1}{2}$, this is $$\psi_f = \frac{B_z\rho^2}{4} \tag{13}$$

Note that $\Phi_f$ has this form both for $\rho<\rho_b$ and $\rho>\rho_b$. Finally, there is the flux associated with the self field, $$\Phi_s=(V_{74}/c^2R\theta(\rho) \tag{14}$$

Thus if $V_{74}\approx c$, near the axis ($\rho\approx 0$) one has that $$P_\theta = \frac{qB_z\rho^2}{4c} + \frac{nR_oq^2\pi}{\gamma^2c}\beta^2 + P_\theta(\rho = o) \tag{15}$$

Since $qB_z<O$ for the modified betatron, one has the result that if n is large enough that the second term dominates (that is, if the beam is diamagnetic), $P_\theta(\rho=0)$ is a relative minimum. However far from the beam $P_\theta$ is dominated by the focusing force which have the opposite sign. Thus $P_\theta$ as a function of $\rho$ for a diamagnetic beam is shown in FIG. 3*a*. On the other hand, if the beam is paramagnetic, the first term on the right hand side of Eq. (15) dominates so $P_\theta$ ($\rho=0$) is a relative maximum, and $P_\theta$ ($\rho$) is shown in FIG. 3*b*.

The crucial point is that in a configuration which has $\theta$ symmetry, $P_\theta$ is an exact constant of motion. Consider then the orbits at $\rho=0$ and $\rho=\rho_\rho$ for a diamagnetic beam. The former is inside the latter and has a lower value of $P_\theta$ according to FIG. 1*a*. After diamagnetic to paramagnetic transition, these values of $P_\theta$ cannot change. However a paramagnetic beam has the reference orbit at a relative maximum so that this must correspond to the orbit initially at $\rho=\rho_b$ in the diamagnetic beam. Thus in making transition the beam must, at the very least, turn itself inside out.

Actually, as shown in Manheimer, supra; Finn, supra; and Grossman supra; not only does the beam turn itself inside out, it transitions from a solid to hollow beam. In doing so, the beam could strike the wall and thereby disrupt. Conditions for the beam to remain confined on transition are given in the three references. However, even if the beam does not remain initially confined, it is not certain it can remain confined long after suffering such a violent perturbation. If nothing else, the hollow profile produced is diocotron unstable.

One other potential difficulty with the modified betatron is the resistive wall instability. If a beam of density n and radius $\rho_b$ is centered in a cylindrical tube of radius a, the frequency of a perturbation at frequency varying like exp $il\phi$ is $$\omega = \left[(l-1) + \left(\frac{\rho_b}{a}\right)^{2l}\right]\frac{V\phi}{\rho} - \omega_b \tag{16}$$

where $V_\phi$ is the rotation frequency of the electrons $$V_\phi = \frac{-c}{B_\theta}(\gamma^2 - f)\, 2\pi nq\rho \tag{17}$$

and $\omega_b$ is the frequency of rotation generated by the focusing fields, $$\omega_b = -\frac{CB_z}{2B_\theta R_o} \tag{18}$$

The focusing fields produce a rotation in the negative direction. Since $q<o$, the rotation of the beam itself is in the positive direction for the case of a vacuum beam, $f=o$. The sign of the frequency is such that as long as $\omega>o$, wall resistivity gives rise to growth of this mode. This can be understood by noting that since the beam has only negative charge, the net force from any perturbation must be outward. Thus, wall resistivity will cause the beam to spiral outward, corresponding to instability. Since the natural frequency of the $l=1$ mode is very low, the sign of this frequency can be changed by the focusing fields, thereby stabilizing this mode. The required condition for this is that the beam current, as defined above, be in the low or intermediate regime. However the l=2 mode has a significantly larger frequency so that in the vacuum modified betatron, it cannot be stabilized by the focusing fields.

SUMMARY OF THE INVENTION

Accordingly one object of the present invention is to provide a novel modified betatron that allows an injected beam to spiral inward toward the center of the betatron with the bam having a net inward poloidal force throughout the beams path.

Another object of the present invention is to provide a modified betatron that does not have a diamagnetic to paramagnetic transition in the injected beam.

Another object of the present invention is to provide a modified betatron that does not have an l=2 resistive wall instability.

Yet another object of the present invention is to provide a novel modified betatron that has the self fields inward in the poloidal plane.

Another object of the present invention is to provide a novel modified betatron that has a very low density background plasma.

These and other objects of the present invention are achieved with a modified betatron for accelerating charged particles, said betatron having a toroidal vacuum chamber in which particle acceleration takes place; means for generating a betatron magnetic field for accelerating charged particles in said vacuum chamber; means for generating a charged particle beam in said vacuum chamber; means for generating an electric field to oppose the electric field induced by the diffusion of the self magnetic field of the beam; and means for energizing said electric field generating means for only the period during which the self magnetic flux diffuses out of said torodial chamber, wherein the improvement comprises means for directing the self magnetic field of the beam inward in the poloidal plane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS 1(*a*) and 1(*b*) are cross-sectional views of an offset beam in a plasma modified and vacuum modified betatron.

FIGS. 2(*a*) and 2(*b*) are cross-sectional views of a beam centered plasma modified and vacuum modified betatron.

DESCRIPTION OF THE PREFERRED EMBODIMENT

Figure 3A:
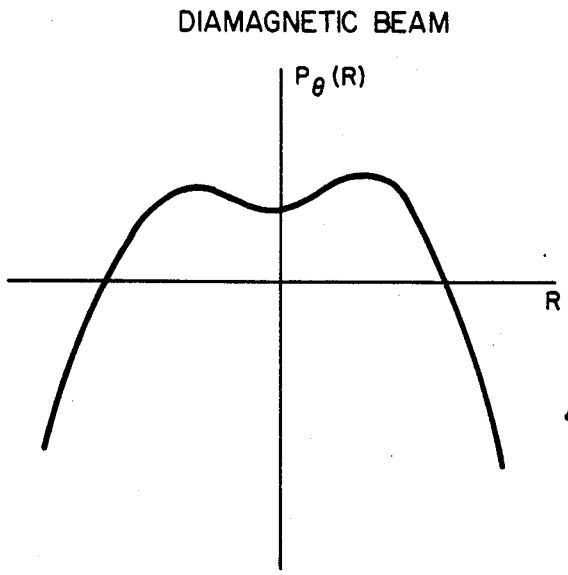
FIGS. 3(*a*) and 3(*b*) are graphs of the dependence of $P_{74}$ for a diamagnetic beam and a paramagnetic beam.
Figure 3B:
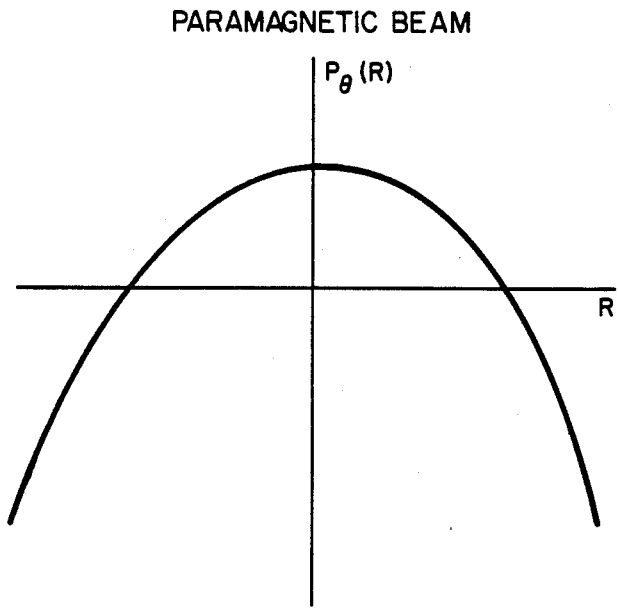

Referring now to the drawings, wherein like reference numerals designate identical or corresponding parts throughout the several views, and more particularly to FIG. 1A thereof, there is shown a cross-section of an offset beam 10 located in liner 12 of the torus of a vacuum chamber 14 of a plasma modified betatron. Field coil 18, which encircles the torus and coil power source 20 therefor, provides the vertical magnetic field for accelerating the electron beam and the focusing fields to oppose the electric field induced by diffusion of the self field of the beam. The force F on the beam 10 is in a negative or inward direction from the center of the liner 12. The plasma 16 in the chamber contributes ions to the beam 10 which negate the force of the image charges (not shown) in the wall of the vacuum vessel due to the beam 10. The image charges contribute a force $$\frac{\gamma^{-2}qI}{10\delta},$$

the plasma contributes a force $$\frac{-fqI}{10\delta}$$

and the focusing fields generated by field coil 18 of the modified betatron contribute a force $$\frac{-q\,Bz}{2R_o}$$

resulting in a net inward force $$(\gamma^{-2} - f)\frac{q\,I}{10\delta} - \frac{qBz\rho}{2R_o}.$$

Here, Bz is the vertical magnetic field, produced by field coil 18 $\rho$ is the displacement of the beam from the equilibrium orbit in the polodial plane, f is the distance from the beam center to the liner, q is the charge, I is the current, f is the fractional neutralization, $\gamma$ is the electron energy divided by $mc^2$, where m is the mass of an electron and c is the speed of light, and Ro is the major radius of the equilibrium orbit of the beam.

FIG. 2A shows the beam 10 in diamagnetic transition after having been centered in the torus of the vacuum chamber 14 in a plasma modified betatron with field coil 18, which encircles the torus and coil power source 20 therefor. The net force on the beam 10 is negative or inward toward the center of the chamber 14. The focusing force of the plasma modified betatron is $-qBz\rho b/2Ro$, where $\rho b$ is the radius of the beam. The image charges in the walls of the vacuum chamber 14 due to the beam 10 contribute an outward force $\gamma^{-2}qI/10\rho b$, and the plasma 16 in the vacuum chamber 14 contributes a force $-qIf/10\rho b$ resulting in a net force on the beam equal to $$\frac{qI}{10\rho_b}(\gamma^{-2} - f) - \frac{qBz\,\rho b}{2R_o}.$$

This is in sharp contrast to the force on the beam in a vacuum modified betatron during injection, see FIG. 1*b*, where the net force on the beam 10, after being injected by diode 22, is positive or outward and away from the center of the chamber 14. The image charges in the wall of the chamber 14 contribute a force $\gamma^{-2}qI/10\delta$, and the focusing force of the vacuum modified betatron contribute a negative or inward force $-qB_2\rho/2Ro$. The net force on the beam is then $$\gamma^{-2}qI/10\delta - qB_2\rho/10Ro$$

and is positive or outward since the image force is larger than the focusing forces for increasing current I. Similarly, in the diamagnetic transition of the beam in the vacuum modified betatron, the image charges contribute a force $qI\gamma^{-2}/10\rho b$ and the focusing forces contribute a force $-qBz\rho b/2Ro$. The net force is $$qI\gamma^{-2}/10\rho b - qB_z\rho b/zRo$$

and is positive or outward for increasing current I.

In the plasma assisted modified betatron, a very low density full ionized preformed plasma is produced in the modified betatron. The electron density in this plasma should be considerably less than the beam density; an electron density of $10^8$ cm$^{-3}$ would be a typical density. This plasma could be produced by distributing along the liner a large number of very small, low power plasma guns. These could be fired simultaneously, or else at some sequence predetermined so that the chamber fills nearly uniformly with plasma. For instance, the guns farthest from the horizontal midplane could be fired earlier. (There are a number of other ways to produce the background plasma including injection and ionization of a gas puff, a microwave plasma discharge, a laser ionized pellet, injection of a plasma from a single plasma gun, or disrupted tokamak plasma). Since the modified betatron has a vertical field that is 5–10% of the toroidal field, the plasmas will drift into the center along the field line. Since the plasma has no equilibrium, it will of course drift out also. However, the time for the plasma to drift in and out is tens of microseconds. When the plasma has a nearly uniform density of say $10^{10}$ cm$^{-3}$ the beam is fired in. Since the toroidal transit time of the beam is about 20 nsec and the poloidal drift time is about 200 nsec, the plasma acts as a stationary background. In response to the electrostatic force of the beam however, plasma electrons are expelled and plasma ions are sucked in, providing a partial charge neutralization of the beam. This charge neutralization should be slightly more than that required to change the sign of the self forces from outward to inward. Since there is a large magnetic inward self force, the fractional neutralization f should be larger than $\gamma^{-2}$ where $\gamma$ is the electron energy divided by $mc^2$.

Since the self forces are now inward in the poloidal plane, wall resistivity will always spiral the beam toward the center. Once the beam is centered, it can be accelerated by increasing the vertical field and flux as in a conventional betatron. In this way the acceleration of a high current (multi kiloamp) electron ring from an initial energy of one to three megavolts to a final energy of tens of megavolts is achieved.

More specifically, the difficulty of beam injection at high or intermediate range currents, the problem of the diamagnetic to paramagnetic transition which occurs even well into the low current range, and the problem of $l \geqq 2$ resistive wall instability in the modified betatron all result from the fact that $\gamma^{-2}-f>0$, or that the beam self forces are outward. One possible cure for all these problems then is to operate the high current modified betatron in the presence of a low density background plasma, so that $\gamma^{-2}-f$ changes sign. This changes the sign of the self forces in the poloidal plane from outward to inward and provides cohesion for the beam itself. On injection, the image forces are now toward the center so that wall resistivity can trap the beam in the center since if the beam is near the lines, it will always spiral inward in the poloidal plane. The beam will always be paramagnetic, so the problems of making transition are eliminated. Also, the frequency of the diocotron mode will be negative so that the resistive wall instability will be stabilized. The plasma densities required are low. For instance for a 10 kA, 2 cm radius beam with $\gamma=4$, background ion density of order $10^{10}$ cm$^{-3}$ is required. For a 1 kA beam, it is an order of magnitude lower.

Although the betatron is envisioned as operating in the presence of a background plasma, the scheme proposed here has little in common with a "plasma betatron". There, the beam is formed from runaway electrons and the beam density is small compared to the background plasma density. See G. J. Budker in proceedings of CERN Symposium on High Energy Accelerators and Pion Physics, Geneva 1956 (CERN Scientific Information Service, Geneva 1956) Vol. 1, pp. 68–76; J. G. Linhat in proceedings of the Fourth International Conference on Ionization Phenomena in Gases, Uppsala, Sweden, ed. N. Robert Nilsson (North Holland, Amsterdam 1960) p. 981; and H. Knoepfel, D. A. Spong and S. J. Zweben, Phys, Fluids 20, 511 (1977). An alternate scheme involves injection of an astron gun produced electron ring into a high density collisional plasma. D. P. Taggart, M. R. Parker, H. J. Hopman, R. Jayakumar and H. H. Fleischmann, Phys, Rev. Lett. 52, 1601 (1984). In the scheme proposed here, a beam is still externally injected, and the preformed plasma denisty is low compared to the beam density.

The most likely approach to produce a fully ionized plasma at a density as low as $10^{10}$ cm$^{-3}$ would be to produce the plasma at much higher density and let it expand into the entire toroidal chamber. The fact that there is a vertical field which is typically five to ten percent of the plasma can drift along a field line from the edge of the chamber to the center. One possible scheme would then be to distribute a large number of very small plasma guns along the top of the liner. These could be made to fire simultaneously so that plasma would line the top of the chamber. As it drifted in along the field the density would decrease due to the expansion. The plasma would expand along the field, (and also outward in major radius) filling the torus. Since the expansion velocity is about $10^6$ cm/sec, it would take many microseconds for the torus to fill. However this is a very long time compared to the 20 nsec transit time of the beam in major radius. Thus when plasma conditions are optimum, the beam would be fired in.

The system envisioned has the beam injected into a very low density plasma in a modified betatron configuration. The question then is how does the plasma respond to the beam, and more specifically how is f related to plasma, beam and system parameters. Here, the electron and ion responses are treated separately. Throughout, it is assumed that the background plasma has sufficiently small density compared to the beam, that the electric fields from the beam dominate those from the plasma. Since the plasma is nearly at rest, there is no $\gamma^{-2}$ cancellation of self electric fields.

The plasma electrons react on two times scales, the fast inertial time scale and the slow collisional time scale. When the beam enters the plasma, a strong inward electric field is set up, $E=-2\pi ne\ \rho i\rho$, where a cylindrical model has been adapted for the beam and $\rho$ is the radius (in the poloidal plane). Assuming this field is set up slowly compared to an inverse cyclotron time ($2.5\times10^{-10}$ sec for a 2 KG field), the beam electrons respond by E×B drifting in the $\theta$ direction and drifting outward due to the inertial drift. It is the intertial drift $$V_{Di} = \frac{d\rho}{dt} = \frac{-c}{B\omega ce}\ \frac{dE}{dt} = \frac{-c}{B\omega ce}\ \frac{d}{dt}\ 2\pi n_b q\rho \tag{19}$$

which expels the electrons, (note $q=-|e|$) from the beam. If an electron starts out at $\rho_i$ when $n_b=t=0$, Eq. (19) can be integrated once to give $$\rho = \frac{\rho_i}{1 - \frac{\omega_{be}^2}{2\omega_{ce}^2}} \tag{20}$$

Equation (20) has an apparent divergence, but of course the expression for E and $\rho$ are valid only for $\rho<\rho_b$, the beam radius. However, Eq. (20) does show that the electrons are totally expelled by the beam if $$\frac{\omega_{be}^2}{2\omega_{ce}^2} > 1.$$

For the 10 kA modified betatron parameters, $\omega_{be}^2/2\omega_{ce}^2 \geqq 0.2$, so about 20% of the plasma electrons are expelled from the beam region as the fields are being set up.

Now consider the longer (collisional) time scale. Electron-ion collisions in the plasma cause a drag force which gives rise to an outward drift $$V_{dv} = \frac{d\rho}{dt} = \frac{-\nu}{\omega_c}\ \frac{c}{B}\ E = \frac{\nu\rho\omega_{be}}{2\omega_{ce}} \tag{21}$$

Thus the electron radius increases exponentially in time with growth rate $\nu\omega_{br}^2/2\omega_{ce}^2$. Classically $$\nu = \frac{n_p\lambda}{3.4 \times 10^5\ T_e\ 3/2} \tag{22}$$

For temperatures of about 1 eV and $n_p \approx 10^{10}\ cm^{-3}$, the Coulomb logarithm $\lambda=10$, so $\nu \approx 3\times 10^5$. Thus the remaining electrons are expelled on a time scale of about 20 $\mu$sec. Since the electrons are forced away from the beam on a 20 $\mu$sec time scale, and even without the beam, the electrons cannot be confined in a toroidal chamber, the electrons are expected to be expelled on a time scale of some tens of microseconds. This time is long compared to the time for the beam to center itself, but short on the time scale of the beam acceleration. Thus, once the beam begins to accelerate, there should be virtually no plasma electrons present.

For the ions however, the story is different because there is a strong attractive force between the ions and the beam. The ion response is now considered.

If an ion is trapped near the center of the beam, its oscillation frequency is $\omega_i=(2\pi n_b e^2/M)^{\frac{1}{2}} - 2\times 10^8\ sec^{-1}$ for protons in a standard 10 kA beam. Since this is ten times larger than the ion cyclotron frequency, the ions are effectively unmagnetized. The ion oscillation time is also much less than the poloidal drift time of the beam.

The ion is initially at rest and when the beam enters, the ion begins to oscillate due to the electric field. Since ions initially within the beam do not leave, and other ions initially outside the beam spend at least part of their oscillation inside the beam, the ion density in the beam increases.

To estimate the steady state ion density, the system is assumed tobe cylindrically symmetric about the beam center. Furthermore all ions oscillate with slightly different frequencies so that after several oscillations, the ions phase mix and are distributed uniformly along their phase orbits. Then, it has been shown that the ion distribution function in velocity space is $$f_i(H,L) = \frac{2n_i\ \delta(L)\omega(H)\ M^2}{\pi e|\partial\phi|\partial\rho|\rho\ =\ \rho(H)} \tag{23}$$

where the constants of motion are $$H = \tfrac{1}{2}MV^2 + q\phi(\rho)\ (a) \tag{24}$$

$$L = mv\rho\ (b)$$

$\rho(H)$ is the maximum radius on an ion with energy H, $\omega(H)$ is the oscillation frequency of an ion with energy H, $\phi(\rho)$ is the electrostatic potential of the beam and $n_i$ is the preformed plasma ion density. If the ion orbit is entirely within the beam $$\left|\frac{\partial\phi}{\partial\rho}\right| = 2\pi n_b e\rho \quad (a) \tag{25}$$

$$\rho(H) = (2H/M\omega_i^2)^{\frac{1}{2}} \quad (b)$$

$$\omega(H) = \omega_i \quad (c)$$

If the ion is initially outside the beam $$\left|\frac{\partial\phi}{\partial\rho}\right| = 2\pi n_b e\rho^2/\rho \quad (a) \tag{26}$$

$$\rho(H) = \rho_b \exp\left[\frac{H}{H(\rho_b)} - 1\right] \quad (b)$$

where $H(\rho_b)=q\phi(\rho_b)$. The frequemcy of the ion outside the beam cannot be computed in closed form. As an approximation to it, use the frequency of an ion which rotates around the beam $$\omega(H)=\omega_i\rho_b/\rho(H) \tag{27}$$

If $\rho(H)>>r_b$, it is not difficult to see that this estimate is off by a factor of order $[\ln\rho(H)/\rho_b]^{\frac{1}{2}}$. The total number of ions trapped in the beam is then $$N_i = 2\pi \int_0^{\rho_b} \rho d\rho \left[ \underset{\mathrm{I}}{\int_{e\phi}^{H(\rho_b)} dH} + \underset{\mathrm{II}}{\int_{H(r_b}^{H} dH \frac{2n_i\rho(H)\omega(H)(M/2)^{\frac{1}{2}}}{\pi e\left|\frac{d\phi}{d\rho}\right|_{\rho(H)} \rho(H - e\phi(\rho))^{\frac{1}{2}}}} \right. \tag{28}$$

The first integral, labeled I is just $\pi\rho_b^2\ n_i$ since it represents those ions originally in the beam. The last integral II, is estimated. To do so, set $$\frac{\rho(H)\omega(H)}{e\left|\frac{d\phi}{d\rho}\right|\rho(H)} \approx \frac{\rho(H)}{M\omega_i\rho_b} \quad \text{(a)} \qquad (29)$$

$$r(H) \sim d \quad \text{(b)}$$

$$(H - e\phi)^{\frac{1}{2}} \sim [H(d)]^{\frac{1}{2}} \quad \text{(c)}$$

where d is the maximum radius in the poloidal plane. In this case, the integral $II \approx \pi n_i \rho_b\, d(1+\ln d/\rho_b)^{\frac{1}{2}}$ so that $$N = n_i \pi \rho_b^2 \left[1 + \frac{d}{\rho_b}(1 + \ln d/\rho_b)\right]^{\frac{1}{2}} \qquad (30)$$

Thus on an ion oscillation time scale, the ion density in the beam is significantly enhanced. If the beam is centered as it is in steady state so $d/\rho_b \approx 5$, the ion density might be enhanced by nearly an order of magnitude. If the beam is near the liner, as it is on injection, a reasonable guess for d is the distance for the liner, so $d \approx 2\rho_b$. In this case the ion density can be enhanced by perhaps a factor of 2.

Thus between the expulsion of plasma electrons from the beam region, and partial trapping of plasma ions within the beam, the neutralizing ion density within the beam should be at least as large as the initial ion density in the plasma. Finally it should be noted that on the time scale of beam acceleration, there should be no plasma electrons in the system. Therefore the accelerating field produced by field coil 18 will not be shielded out by any background plasma, and the beam should accelerate as would a vacuum betatron.

Another potential problem with the plasma assisted modified betatron is the ion resonance instability. This instability arises from the fact that the ion oscillation frequency is different from the electron rotation frequency in the poloidal plane. This is a particular concern because is it now established that two other similar devices, HIPAC (J. D. Daughty, J. E. Emnger and G. S. Janes, Phys. Fluids 12, 2677) and SPAC II (A. Mohri, M. Masuzaki, T. Tsuzuk, and K. Iruth, Phys. Rev. Rev Lett. 34, 574 (1975)) were distruped by the ion resonance instability. However in both of these devices the beam nearly filled the chamber, making it particularly susceptible to the l=1 instability. For the modified betatron with $\rho_b << a$, the l=1 mode should not go unstable and the main danger is an l=2 mode. This mode was not observed on HIPAC or SPAC II. In the modified betatron, even if paremeters are right for it, there is still a good chance that it will be stabilized by the diffuse profile.

The ion resonance instability can occur if the ion bounce frequency is roughly equal to the l=2 diocotron mode frequency. According to W. M. Manheimer, Particle Accel. 13,209 (1983), this can occur only if $$\gamma < \frac{\omega_{be}}{2\omega_{ce}}^{\frac{1}{2}} \left(\frac{M}{2m}\right)^{\frac{1}{4}} \qquad (31)$$

For the standard parameters of the 10 kA beam, $\omega_{be} \approx 2.4 \times 10^{10}$, $\omega_{ce}$ $4 \times 10^{10}$, M/m=1800, Eq. (31) above reduces to $\gamma < 3$. Thus as long as $\gamma > 3$ after self field diffusion, the plasma background should not give rise to an ion resonance instability.

Another concern is the ion streaming instability. In this instability a cyclotron mode on the beam resonates with the stationary ions. The instability only occurs if the parellel wave number is in the range $$\frac{\omega_{ce}}{\gamma c} < k < \left[\left(\frac{\omega_{ce}}{\gamma c}\right)^2 + \frac{\omega^2 pe}{\gamma^3 c^2}\right]^{\frac{1}{2}} \qquad (32)$$

and the growth rate is roughly $$Im\omega \sim \frac{n_i\,\omega}{n_e 8\gamma^2 \omega_{ce}\left(\frac{\omega_{ce}\rho_b}{c}\right)^3} \qquad (33)$$

For the standard parameters here, the growth time is about 20 μsec and the range of unstable k is several percent and is dependent on γ. The idea then is to accelerate the beam so that γ changes by several percent in a few growth times.

In the modified betatron, the difficulties with injection, diamagnetic to paramagnetic transition, and l=2 resistive wall instability all have their origin in the fact that the beam self forces are outward int he poloidal plane. By utilizing a very small amount of fractional charge neutralization, the sign of the self force reverses and becomes inward in the poloidal plane. This greatly alleviates the problem of injection, since if the beam is injected near the liner, wall resistivity is sufficient to move it from the liner to the center. Also there is no diamagnetic to paramagnetic transition since beam will always be in the paramagnetic state (the same state as a conventional betatron). Also since the poloidal forces are inward, the =2 resistive wall instability will be stabilized.

The plasma betatron or runaway tokamak betatron, on the other hand, also has inward self forces. However, unlike the plasma assisted modified betatron there is no separately injected, well-defined, monoenergetic, centered beam. Thus extraction of the beam from one of these devices should be nearly impossible.

Lastly, it should be noted that the electron beam should have a density at least $10^{10}$ electrons per centimeter cubed, with the background plasma having a density 1–10% of the beam density.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. In a modified betatron for accelerating charged particles, said betatron having a toroidal vacuum chamber in which particle acceleration takes place; means for generating a betatron magnetic field for accelerating charged particles in said vacuum chamber; means for generating a charged particle beam having a self magnetic field in said vacuum chamber; means for generating an electric field to oppose the electric field induced by the diffusion of the self magnetic field of the beam; and means for energizing said electric field generating means for only the period during which the self magnetic field diffuses out of said torodial chamber; wherein the improvement comprises means for directing the self forces of the beam inward in the poloidal plane.

2. An apparatus as described in claim 1 wherein the directing means is a background plasma having a density between 1% and 10% of the beam density disposed throughout the vacuum chamber, said beam density being at least $10^{10}$ electrons per centimeter cubed.

3. An apparatus as described in claim 2 wherein the background plasma is an ionized gas puff.

4. An apparatus as described in claim 2 wherein the background plasma is a microwave plasma discharge.

5. An apparatus as described in claim 2 wherein the background plasma is a laser ionized pellet.

6. An apparatus as described in claim 2 wherein the background plasma is a disrupted tokamak plasma.

7. An apparatus as described in claim 2 wherein the background plasma is a plasma from a single plasma gun, said plasma gun located in the vacuum chamber and firing the plasma into the vacuum chamber.

* * * * *